(12) United States Patent
Farrell (10) Patent No.: US 8,291,794 B2
(45) Date of Patent: *Oct. 23, 2012

(54) COMPACT ERGONOMIC RESCUE TOOL

(75) Inventor: Terry C. Farrell, Conneaut Lake, PA (US)

(73) Assignee: Channellock, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/267,431

(22) Filed: Oct. 6, 2011

(65) Prior Publication Data

US 2012/0036647 A1 Feb. 16, 2012

Related U.S. Application Data

(60) Continuation-in-part of application No. 12/751,204, filed on Mar. 31, 2010, now Pat. No. 8,065,939, which is a division of application No. 12/419,592, filed on Apr. 7, 2009, now Pat. No. 8,061,239, which is a continuation-in-part of application No. 11/857,010, filed on Sep. 18, 2007, which is a continuation-in-part of application No. 11/493,682, filed on Jul. 26, 2006, now abandoned.

(51) Int. Cl.
*B25B 7/22* (2006.01)
*B25F 1/00* (2006.01)

(52) U.S. Cl. ........................ 81/415; 7/127; 7/138; 7/166

(58) Field of Classification Search ................. 81/125.1, 81/415, 427.5, 416, 311, 176.1; 7/125–128, 7/137, 138, 166

See application file for complete search history.

(56) References Cited

U.S. PATENT DOCUMENTS

| | | | | | |
|---|---|---|---|---|---|
| 69,896 | A | * | 10/1867 | Bitter | ................................. 7/127 |
| 563,577 | A | * | 7/1896 | Drum | ................................. 7/127 |
| 3,833,953 | A | * | 9/1974 | Fisher et al. | .................... 81/415 |
| 5,673,955 | A | * | 10/1997 | Neubauer | ........................ 81/416 |
| 2006/0156474 | A1 | * | 7/2006 | Gillingham | ........................ 7/129 |

* cited by examiner

*Primary Examiner* — Hadi Shakeri
(74) *Attorney, Agent, or Firm* — Lackenbach Siegel, LLP (57) ABSTRACT

A compact readily pocket stowable ergonomic grip rescue tool includes pivotally fully opened handles in an obtuse angle disposition with one handle separately gripped with hand and thumb conforming functionality. A leverage force is transmitted from the gripped handle through force bearing surfaces to the oppositely disposed handle having an outwardly disposed generally sinusoidal surface and juxtaposed hook end which engage a seized fire hose coupling. A resultant high torque force is generated by the compact pocket stowable tool to readily uncouple seized fire hose coupling.

16 Claims, 14 Drawing Sheets

COMPACT ERGONOMIC RESCUE TOOL

PRIOR RELATED APPLICATIONS

This application is a continuation-in part of divisional patent application Ser. No. 12/751,204, filed Mar. 31, 2010, now U.S. Pat. No. 8,065,939, which is a divisional application of Ser. No. 12/419,592, filed Apr. 7, 2009, now U.S. Pat. No. 8,061,239, which is continuation-in-part of application Ser. No. 11/857,010, filed Sep. 18, 2007, which is a continuation-in-part of application Ser. No. 11/493,682, filed Jul. 26, 2006, now abandoned, and claims priority thereto and incorporates the priority applications herein in their entireties by reference thereto.

BACKGROUND OF THE INVENTION

1. Field of the Invention

This invention relates to hand tools. This invention specifically relates to hand tools having improved multiple functionalities. This invention specifically relates to a firefighter or rescue tool having multiple functionalities and a method of using a firefighter rescue tool. This invention more specifically relates to a rescue tool readily accessible to and operable by firefighters in exigent circumstances, such as rescue and wildcat fire operations.

2. Background of the Prior Art

The firefighter tool art is directed to large heavy-duty tools for readily exerting high forces under exigent circumstances, such as rescue operations.

Firefighter tools having multiple functions are disclosed in USD210,141, granted Feb. 13, 1968 to Woods; USD226,162, granted Jan. 30, 1973 to Zlayele, Jr., USD233,405, granted Oct. 29, 1974 to Frey; USD244,252, granted May 10, 1997 to Ardis; USD281,216, granted Nov. 5, 1985 to Cutliff, Jr, et al.; USD329,972, granted Oct. 6, 1992 to Calvagno; U.S. Pat. No. 1,561,647, granted Nov. 17, 1925 to Johnson; U.S. Pat. No. 2,360,163, granted Oct. 10, 1944 to Sadler; U.S. Pat. No. 3,599,255 granted Oct. 21, 1968 to Carroll, Sr.; U.S. Pat. No. 3,949,439, granted Apr. 13, 1976 to Ardis; U.S. Pat. No. 4,287,623, granted Sep. 8, 1981 to Tarran; U.S. Pat. No. 4,597,123, granted Jul. 1, 1986 to Cobe, Jr.; U.S. Pat. No. 4,646,378, granted Mar. 3, 1987 to Borden; U.S. Pat. No. 5,105,493, granted Apr. 21, 1992 to Lugtenaar; U.S. Pat. No. 5,428,853, granted Jul. 4, 1995 to Menke; U.S. Pat. No. 6,308,355, granted Oct. 30, 2001 to McMillan et al.; U.S. Pat. No. 6,397,420, granted Jun. 4, 2002 to Roxton; U.S. Pat. No. 6,899,001, granted May 31, 2005 to Sanders et al.; and US Publication 2004/0261188, published Dec. 30, 2004 to Mathis.

The art directed to wrenches generally discloses a heavy-duty unitary member having a hook for engaging one specifically sized coupling as disclosed in USD138,515 to Hardy, USD337,492 to Ryan et al. and U.S. Pat. No. 6,705,182 to Bennett.

The art directed to firefighter tools generally discloses a movable or displaceable hook or other movable element to engage diversely sized couplings as disclosed in U.S. Pat. No. 6,298,754 to Brown, U.S. Pat. No. 1,936,359 to Huthsing et al. U.S. Pat. No. 5,428,853 to Menke et al., U.S. Pat. No. 5,247,715 to Nishiguchi.

Figure 1:
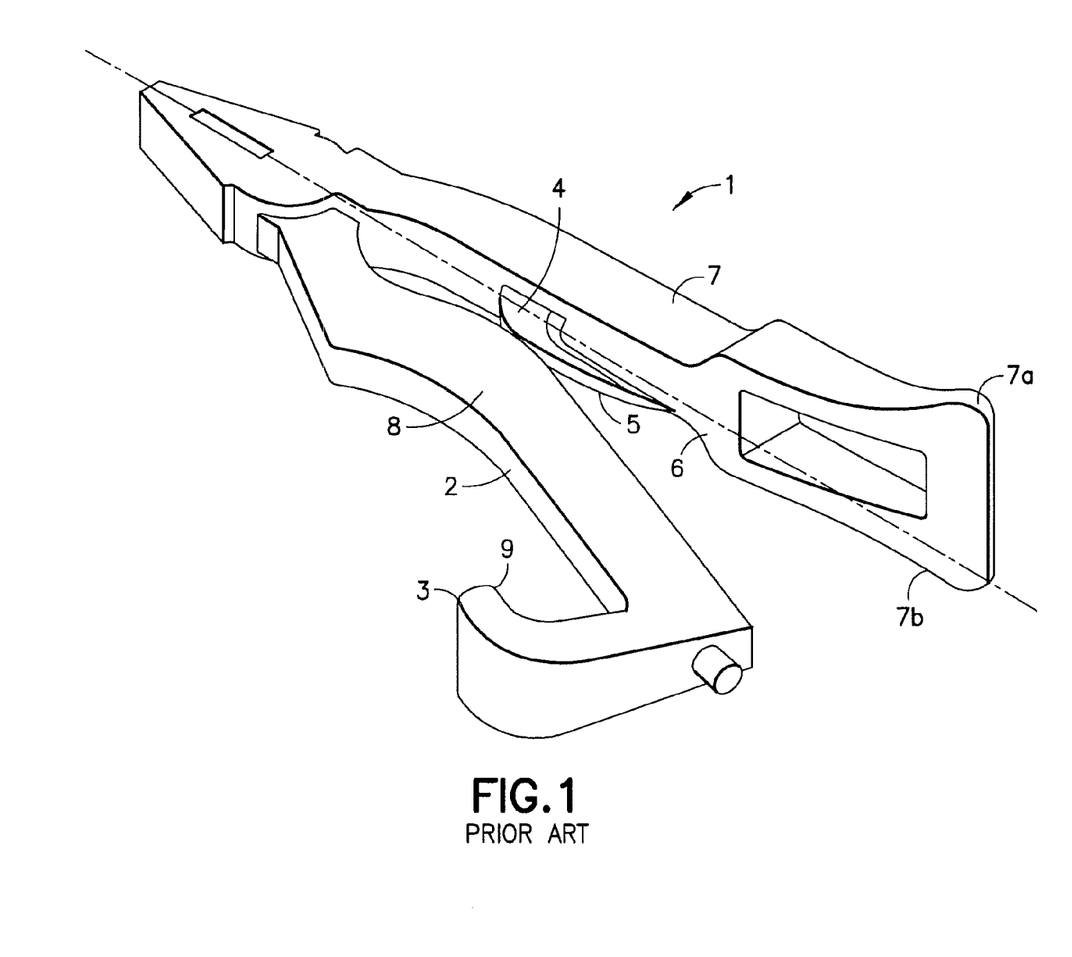
FIG. 1 is a proximate end perspective view of a PRIOR ART multi-purpose rescue tool ("the Gillingham Tool")

Referring specifically to FIG. 1 (PRIOR ART), there is shown the multi-purpose rescue tool disclosed in US Publication No. 2006/015674, published Jul. 20, 2006 to Gillingham ("the Gillingham tool"). The Gillingham tool is difficult to operate and is not readily stowable for ready access in exigent circumstances. The Gillingham tool 1 includes handle 7 and handle 8 having a planar contact surface 2 for engaging small sized fire hose couplings (not shown), wherein there is line contact between the coupling cylindrical surface and the handle planar contact surface 2. The Gillingham hook end 3 is curved with a terminal sharp edge 9. Planar contact surface 2 in conjunction with hook end 3 has a limited range of utility. The Gillingham tool is only operable with the handles in the closed position. Handles 7 and 8 open to only a limited degree for cable cutting functionality only. Arm 4 with cutter 5 are disposed on the inside 6 of handle 7 and prevents a user from gripping handle 7. The flared wedge has ends 7a and 7b further prevent a user from griping handle 7. The Gillingham handles 7 and 8 subtend an angle of no more than about 37° in the fully open position (not shown). This limited open position is for the purpose of the jaws cutting a cable. Hook end 3 has no operability in the handles open position.

Figure 2:
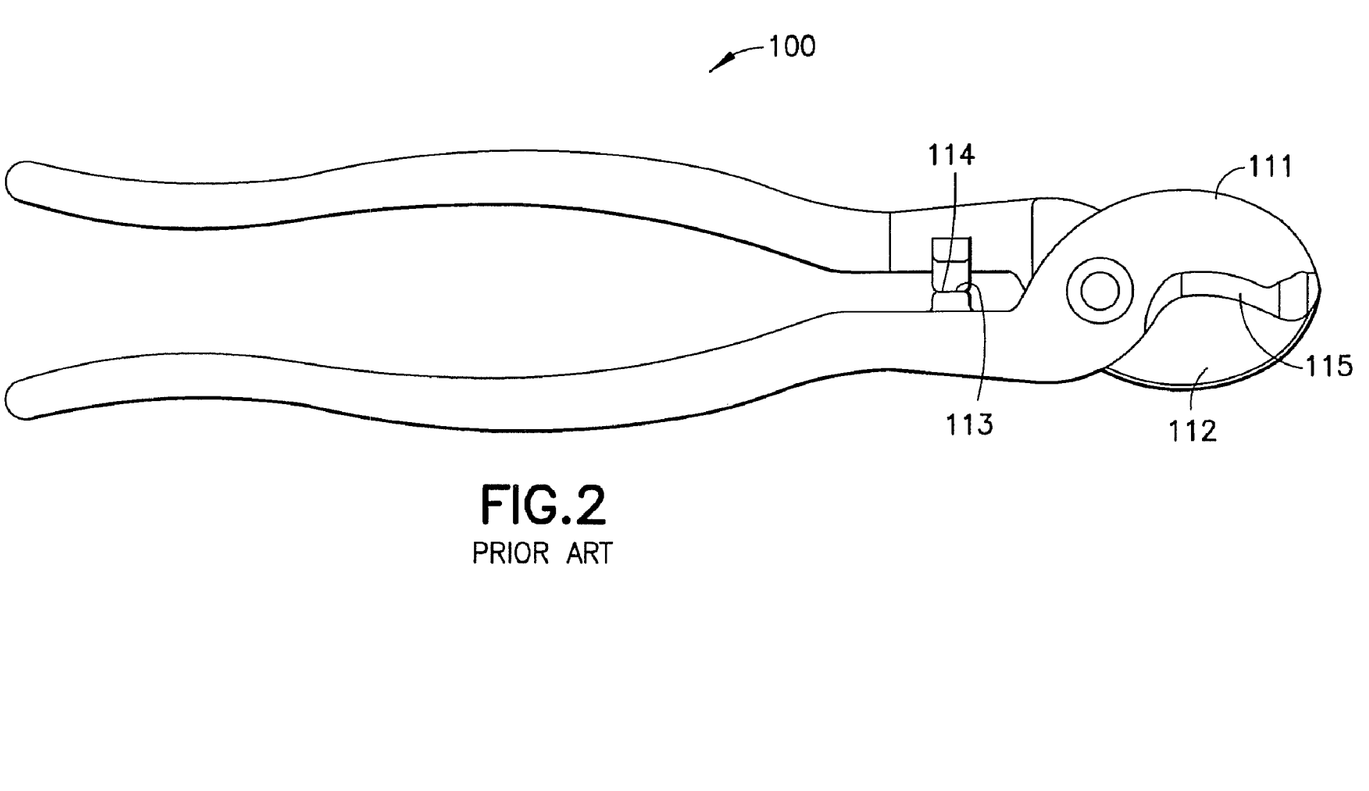
FIG. 2 is a front elevational view of a PRIOR ART cable cutter.
Figure 3:
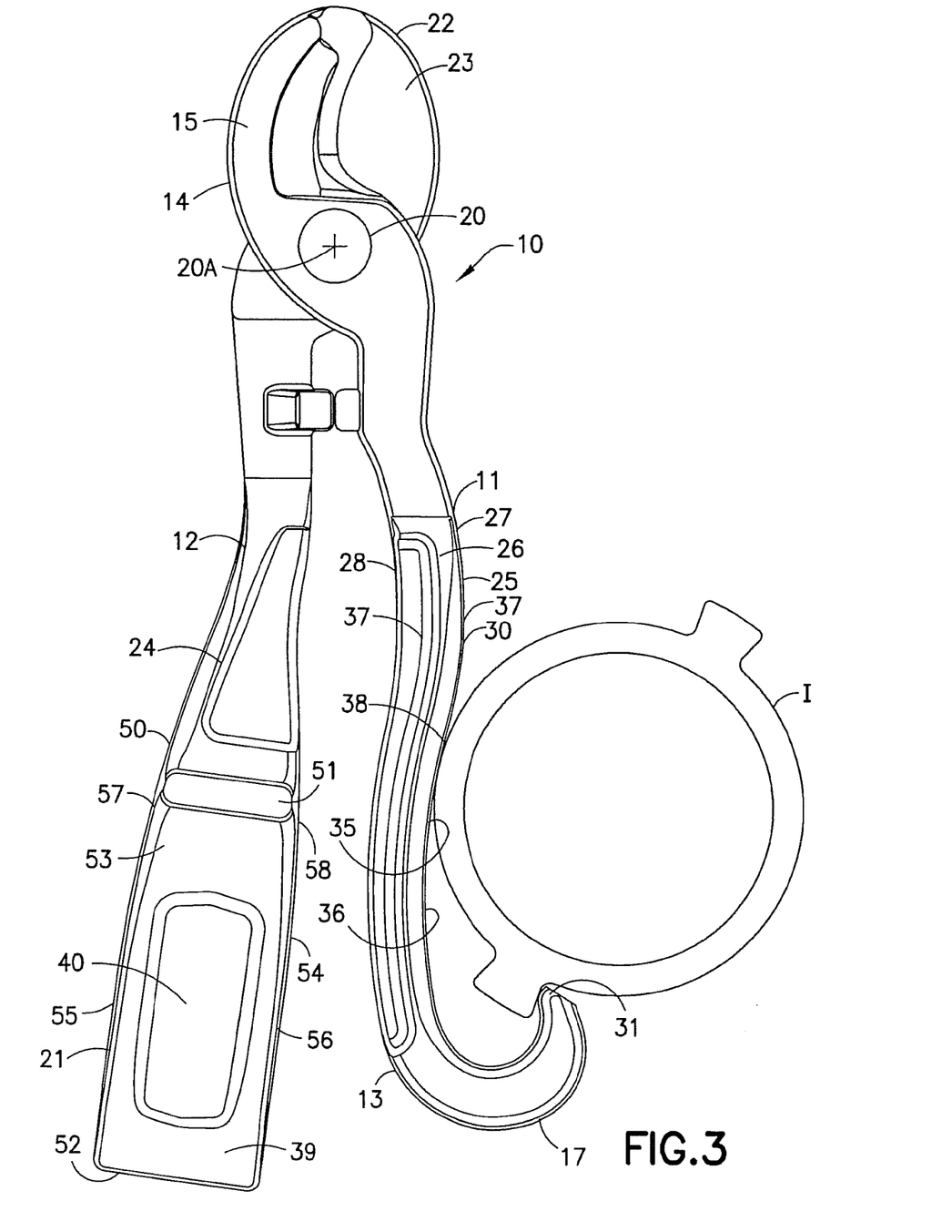
FIG. 3 is a front elevational view of the rescue or firefighter tool of the present invention in a fully closed position and engaging a fire hose coupling.

Referring specifically to FIG. 2 (PRIOR ART), there is shown pliers 100 with jaws 111 and 112 for cutting a cable (not shown). Jaws 111 and 112 have elongate generally arcuate cutting edges 115 disposed in different planes. In the fully closed position (as shown) stops 113 and 114 limit the closure of jaws 111 and 112. Pliers 100 are useful for only cutting cables with relatively soft metal components. Cutting edges 115 would readily chip in an attempt to cut metal sheath cables.

The art directed to firefighter tools desires a rescue tool that is readily accessible and yet provides effective forces in cutting heavy-duty or metal sheath cables such as present in hybrid automobiles, in jimmying seized windows, and opening seized fire hose couplings of diverse sizes and lug configurations. The firefighter tool art also desires a tool that is practical in remote locations such as wildcat fire locales, and yet effective in readily uncoupling seized couplings on firefighter carried extinguishers. The present invention provides solutions to each and all the foregoing prior art needs and is a readily operated tool of practical design, manufacture and construction.

SUMMARY OF THE INVENTION

The present invention in one aspect is a compact rescue tool that despite the lightweight and compactness develops a more than sufficient torque to uncouple a seized fire hose coupling. The tool is pocket stowable and readily retrievable.

The present rescue tool in a further aspect is a lightweight compact tool of complementary relatively short handles, wherein the lightweight tool is pocket stowable and readily gripped and removable. The handles may, in diverse operable modes, be gripped for cutting heavy duty metal component cables, or when the closed jaws are gripped the wedge edge is operated, and alternatively in combination with the opposed handle specifically contoured generally sinusoidal outer surface and hook to operably engage diversely sized and configured fire hose couplings to uncoupled the coupling. In the handles fully open mode, a high torque force is generated by the compact lightweight tool so as to rapidly uncouple the seized fire hose coupling. The compact tool has T-shaped sectioned handles which provide both a lightweight construction and thumb or index finger engaging recesses for effective gripping. The handles open to approximately 114° in the fully opened operable position.

The wedge end handle is elongate and the hook end handle is non-elongate. The handles and arcuate jaws cutting edges provide improved cutting of heavy duty electrical cable such as an aluminum shielded hybrid car battery cable. The wedge edge is disposed at between 85° and 89°, and preferably 88°, of the tool center plane in the fully closed position. The wedge is contoured to be effectively and comfortably separately gripped in the fully opened or second mode position to engagingly the fire hose coupling is engaged by the sinusoidal outer surface and hook of the opposed handle. The elongate handle and non-elongate handles have specific handle lengths and ratio. The handles and jaws have respective force bearing surfaces which permit high torque forces to be rapidly exerted on a seized fire hose coupling. The closed compact tool is readily stowed in a cargo pants pocket for ready access and operability.

The present invention, in another aspect, is a compact tool which when fully opened to about 114°, and the hook and opposed generally sinusoidal surface are contactingly engaged with a 4" fire hose coupling, so that when an about 100 lb. leverage force is exerted on the wedge handle, there is a resultant torque force of at least about 425 lb. exerted on the seized coupling sufficient to uncouple the coupling. There is also minimal resultant stress and minimal resultant flexure on the tool. The present tool surprisingly results in less stress and flexure than the tool of U.S. Ser. No. 12/751,204, now U.S. Pat. No. 8,065,939.

The present tool provides for readily access and engagement of a seized fire hose coupling in the handles fully closed and fully opened positions. The fully closed position is useful in confined space operations such as on a fire truck. The fully opened position is useful in an unconfined space and for weathered seized coupling operation. In one further aspect, the tool is pocket stowed, and then used in remote locations, such as uncoupling a seized coupling on a firefighter carried extinguisher in remote wildcat fire locates.

In one further embodiment, the tool functions as a cable cutter for rapidly cutting metal sheath cables such as aluminum sheath hybrid car battery cables. The cable cutter has opposed elongate arcuate first and second cutting edges disposed in different planes.

In another embodiment, the invention is a method of operating the rescue tool as aforesaid.

DESCRIPTION OF THE INVENTION

The Rescue Tool

Referring to FIGS. 2-15, there is shown rescue or firefighter tool 10. Tool 10 includes members 11 and 12 pivotally connected by pivot member 20 having pivot axis 20A. Member 11 has a proximate end 13 and a distal end 14. Distal end 14 includes jaw 15. Proximate end 13 includes hook 17 with hook end 31 for purposes hereinafter appearing. Member 12 has a proximate end 21 and a distal end 22. Distal end 22 includes jaw 23. Member 12 includes handle portion 24. Member 11 includes handle portion 25. Jaws 15 and 23 pivotably open and close with the movement of the handle portions 24 and 25, by pivot member 20 and pivot axis 20A.

Figure 4:
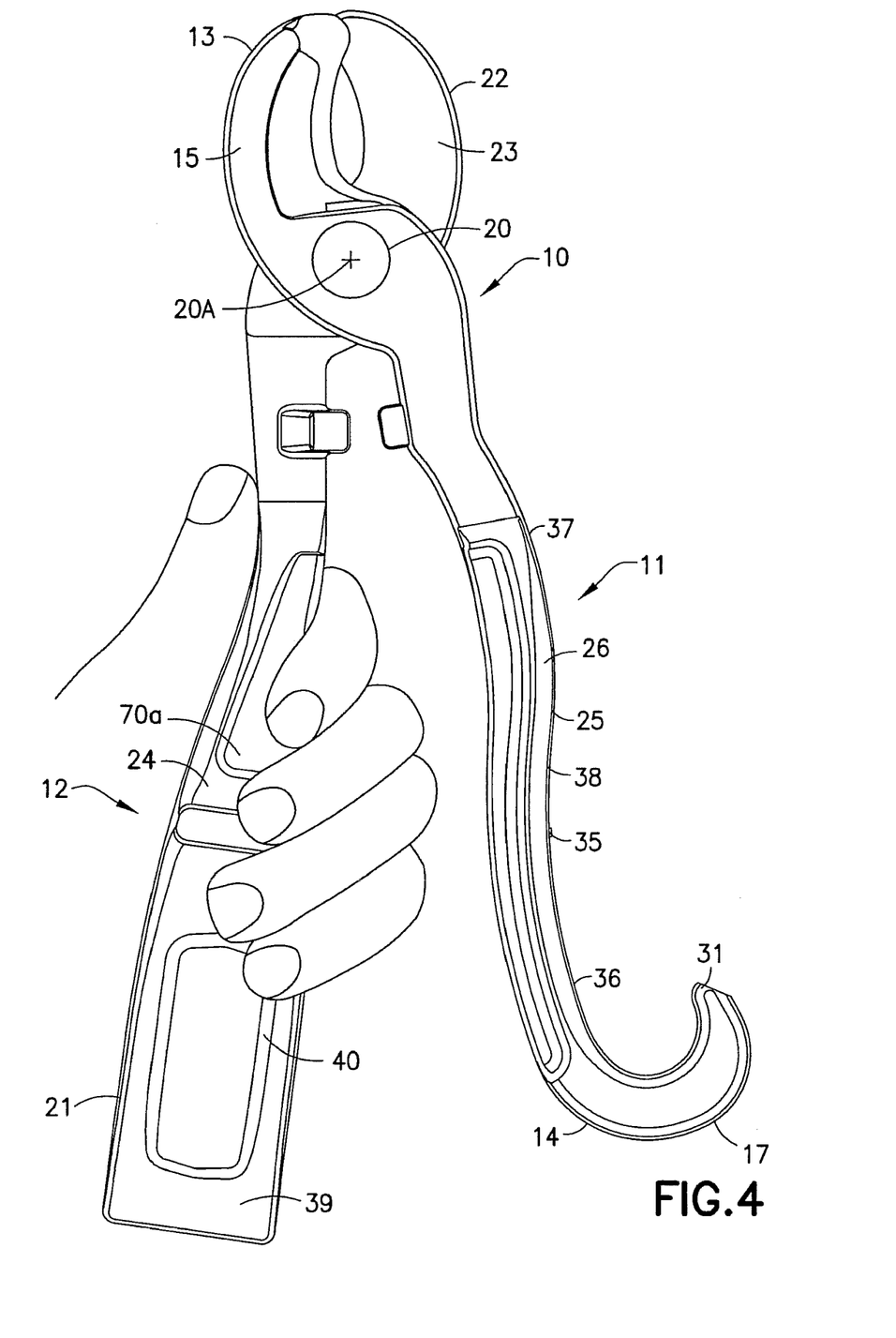
FIG. 4 is a front elevational view of the firefighter tool in a partially open position gripped by the user in one gripped mode.
Figure 9:
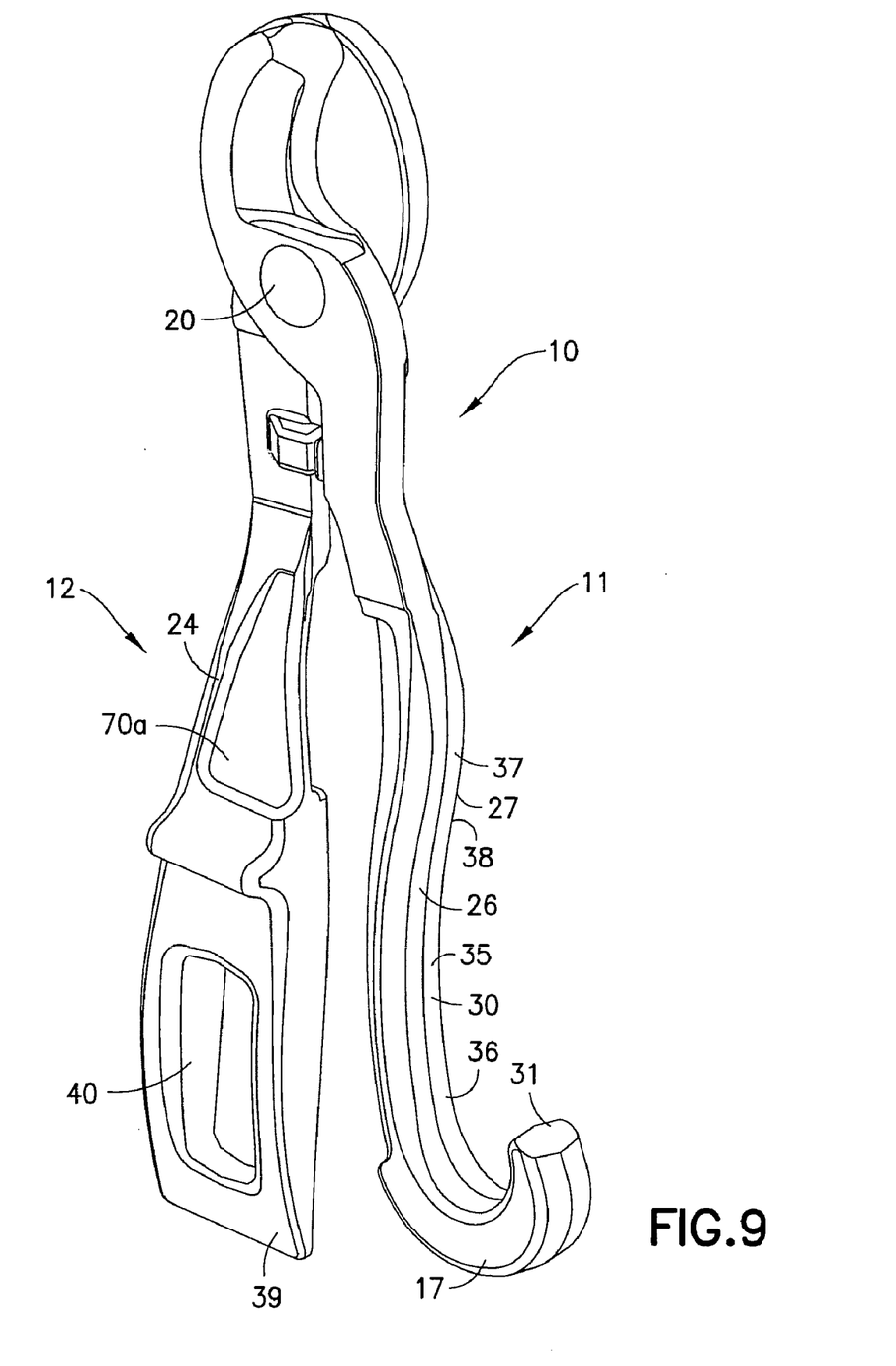
FIG. 9 is a right perspective view of the tool in the closed position.

Referring to FIGS. 4 and 9, handle 11 is formed with a front surface 26, a rear surface 27, an inner surface 28 and an outer surface 30. Outer surface 30 is specifically configured in a generally sinusoidal curvature 35. Surface curvature 35 includes a proximately disposed concave portion 36, a distally disposed convex portion 37, on an intermediate or transitional portion 38, for purposes hereinafter appearing. The respective radii of curvatures 36 and 37 are about equal. Handle 24 includes a wedge 39 formed at proximate end 21. A through hole wrench 40 is disposed between handle portion 24 and wedge 39. The centerline of through hole wrench 40 is in about parallel disposition with pivot axis 20A of pivot member 20.

Figure 5:
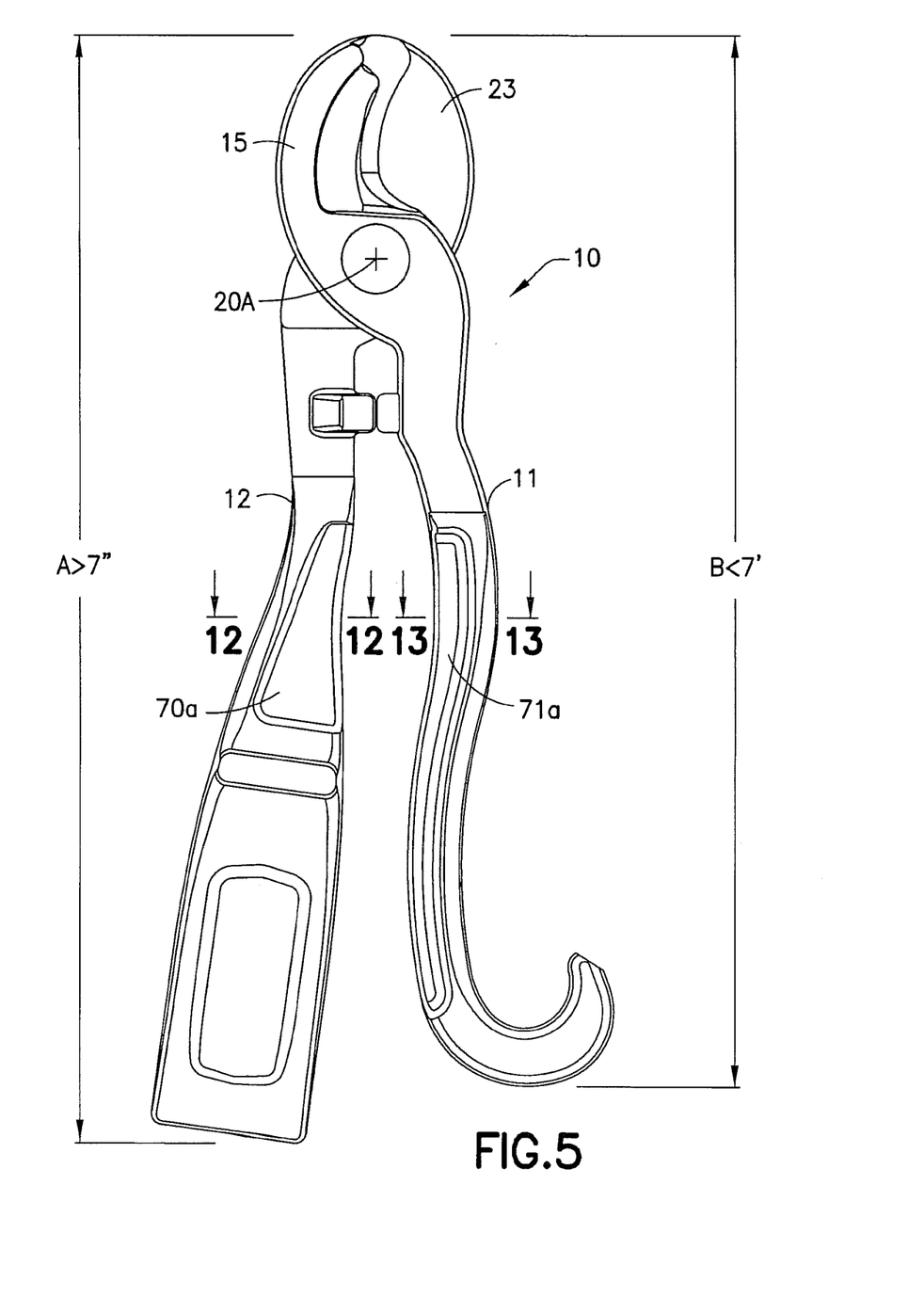
FIG. 5 is a front elevation view of the firefighter tool of the present invention in the fully closed position showing the handle lengths.
Figure 6:
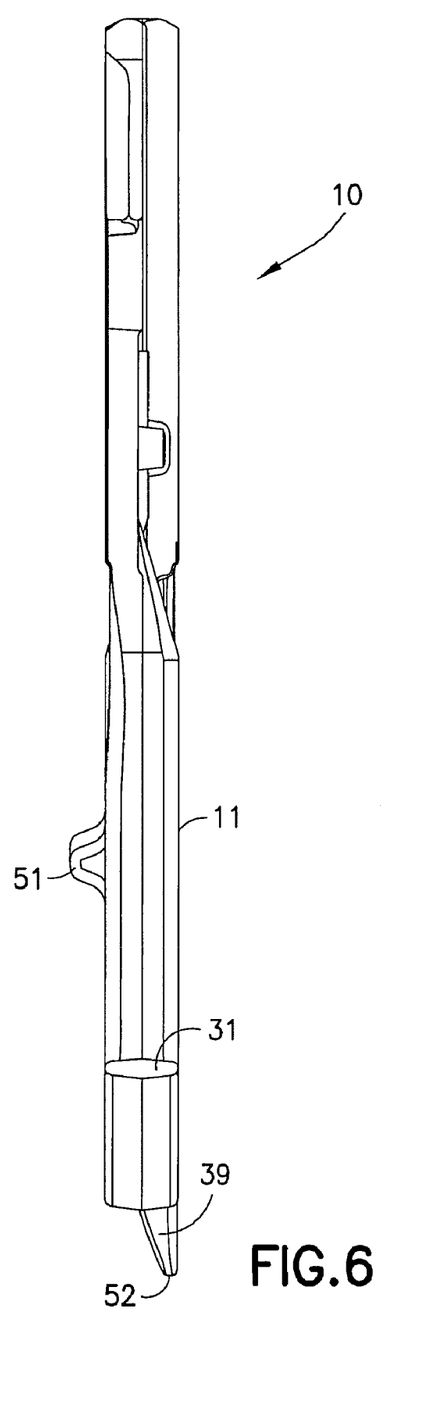
FIG. 6 is a right side view of the handle of the firefighter tool in the fully closed position gripped by the user in a second gripped mode in the thumb received recess.

Referring specifically to FIG. 5, there is shown tool 10 in the fully closed position. Jaws 15 and 23 are slidably contactingly engaged. A user grips closed jaws 15 and 23 and use wedge 21 or wrench 40 of member 12. The user can otherwise grip closed jaws 15 and 23 and use the so specifically configured surface 35 in cooperation with hook end 31 for uncoupling a fire hose coupling or cap, as more fully discussed hereinafter.

The Pocket Stowable and Handle Grip Construction

Handle 12 has a length A of greater than 7 inches, and handle 11 has a length B of less than 7 inches, and handle A is approximately 20% longer than handle B (FIG. 5), and the length ratio A:B is about 1.2:1.0.

Figure 11:
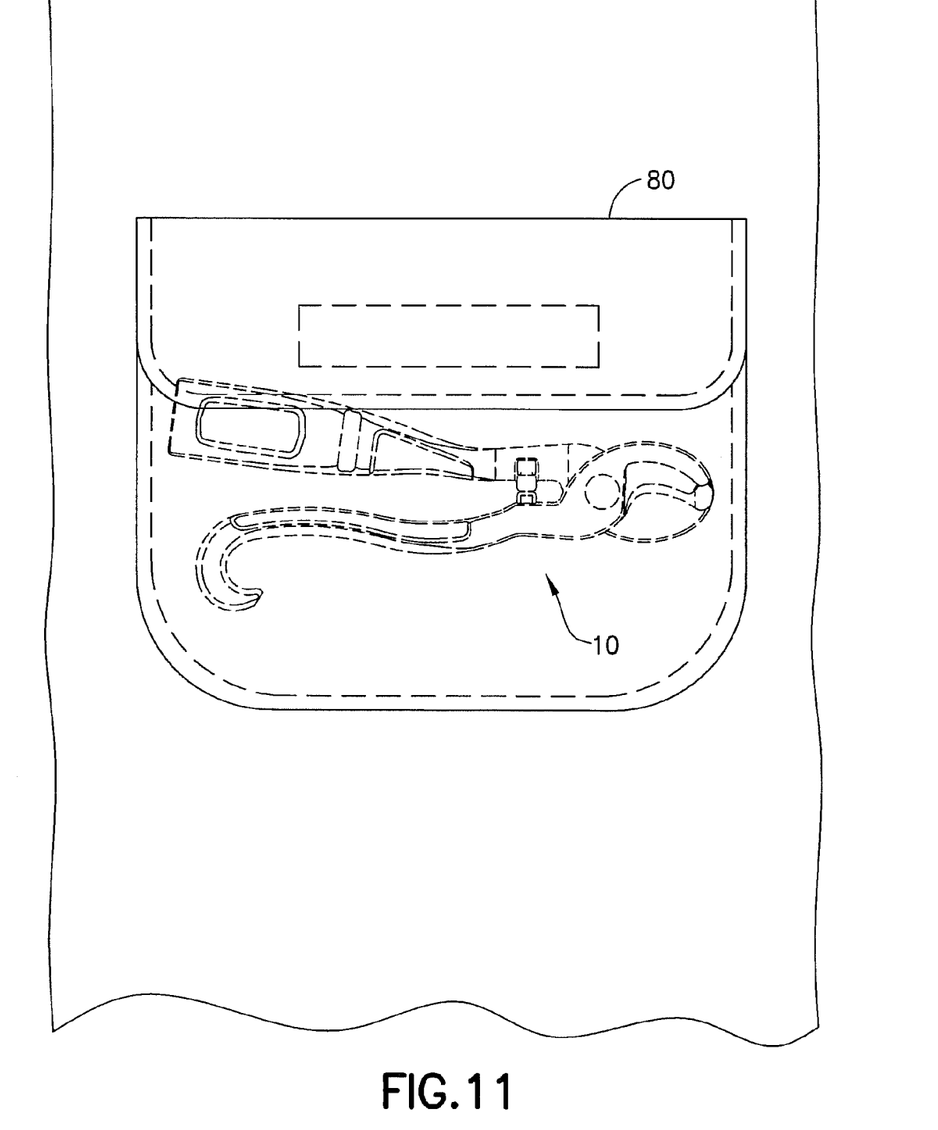
FIG. 11 is a view showing the closed tool stowed in a cargo pants pocket.
Figure 12:
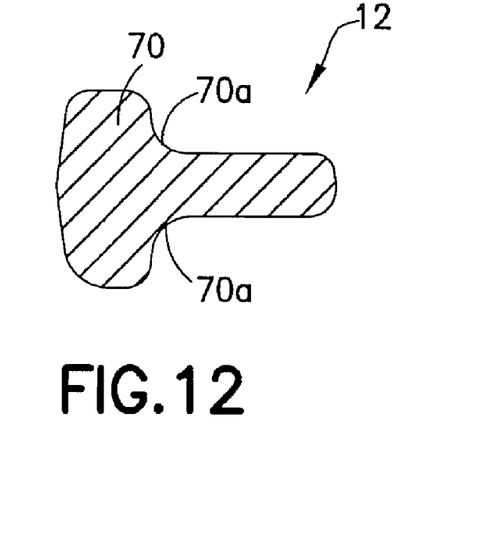
FIG. 12 is a sectional view taken along line 12-12 of FIG. 5.
Figure 13:
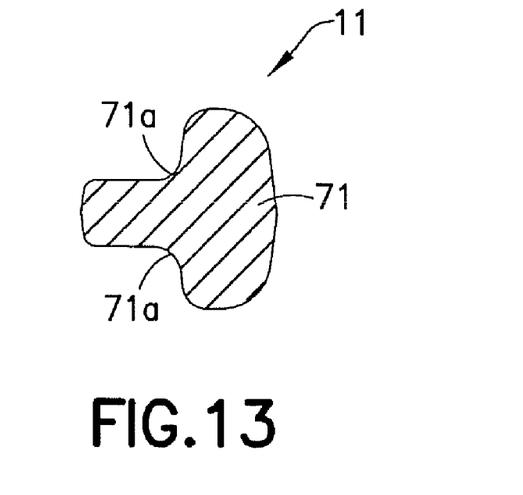
FIG. 13 is a sectional view taken along line 13-13 of FIG. 5.

Tool 10 in the closed position as shown in FIG. 5, is readily stowable in a cargo pants pocket, as best shown in FIG. 11. The handles have T-shaped sections, 70 and 71 as best shown in FIGS. 5, 9, 12 and 13. The T-shaped sections provide oppositely disposed thumb grip engaging recesses 70a and 71a, in combination with a lightweight compact construction. This compact lightweight configuration and construction permits the closed tool 10 to be comfortably stowed in flap-closed cargo pants pocket 80 (FIG. 11), and then readily removed and thumb or index finger recessed gripped for ready use in a rescue operation. This compact and stowable tool develops a torque force comparable to the large heavy-duty tool disclosed in Ser. No. 12/751,204, now U.S. Pat. No. 8,065,939.

The Wedge or Wrench Grip Construction

Figure 7:
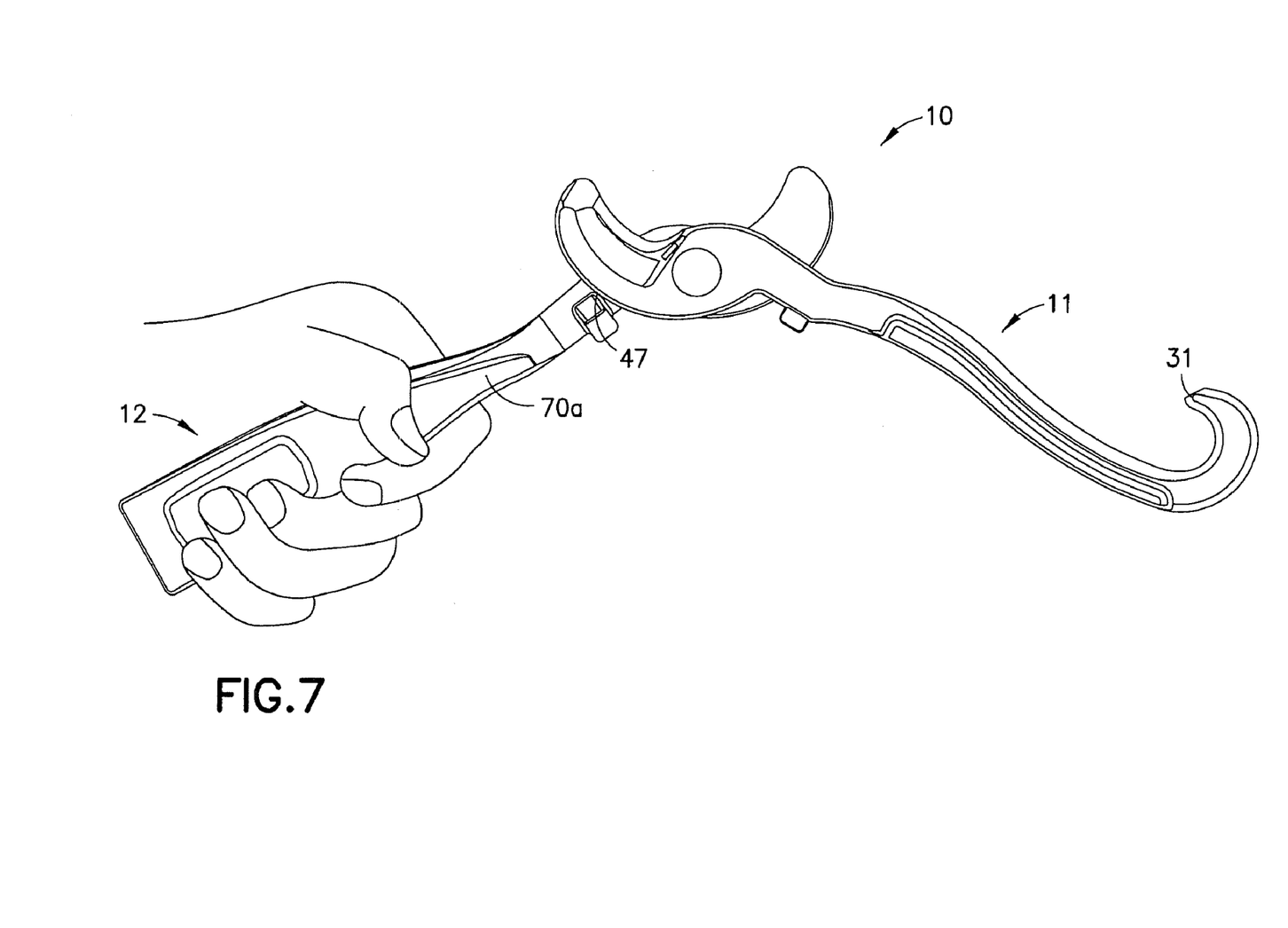
FIG. 7 is a front elevational view of the firefighter tool gripped in the fully open position.
Figure 8:
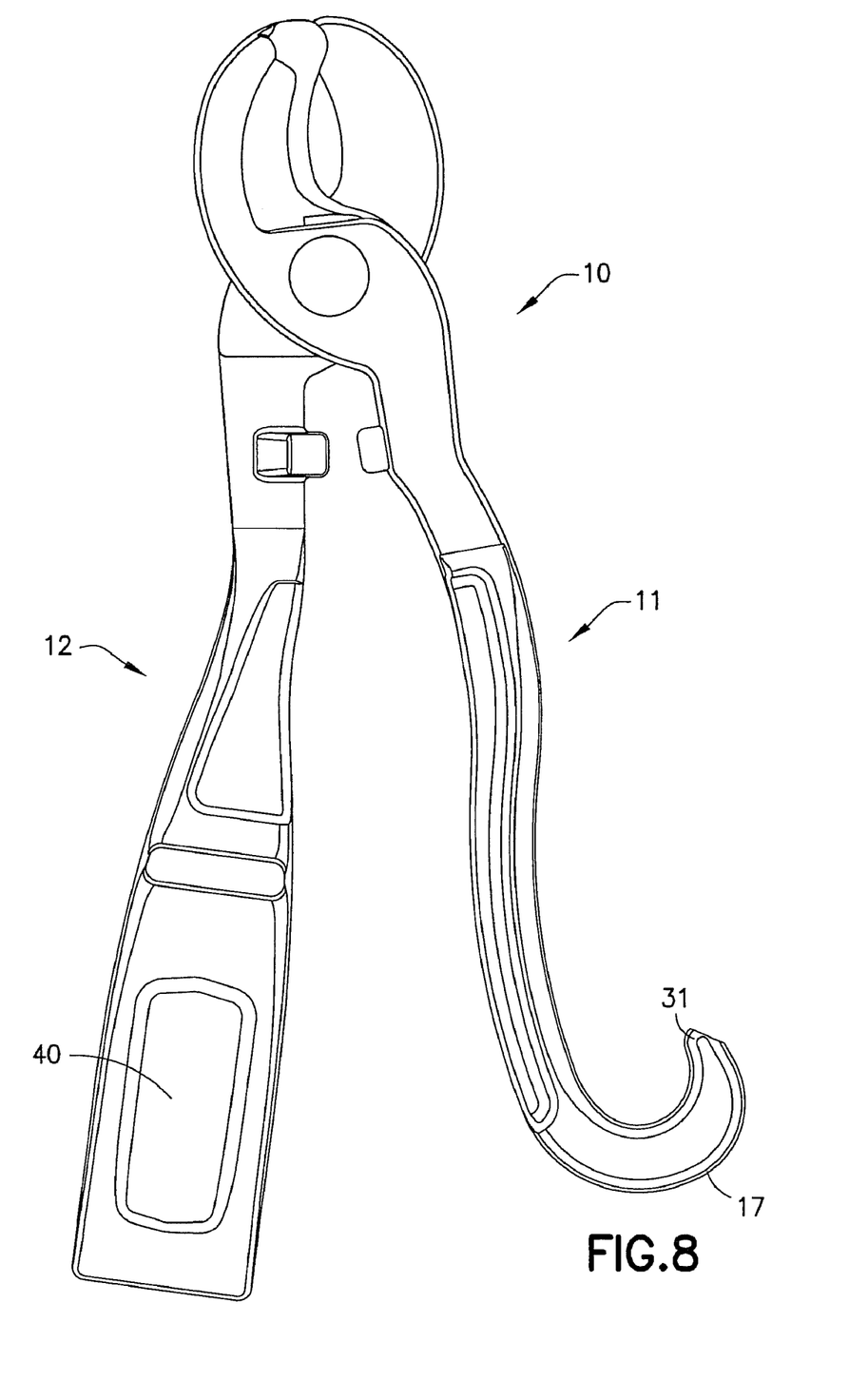
FIG. 8 is a view as in FIG. 4 without the user gripped.
Figure 14:
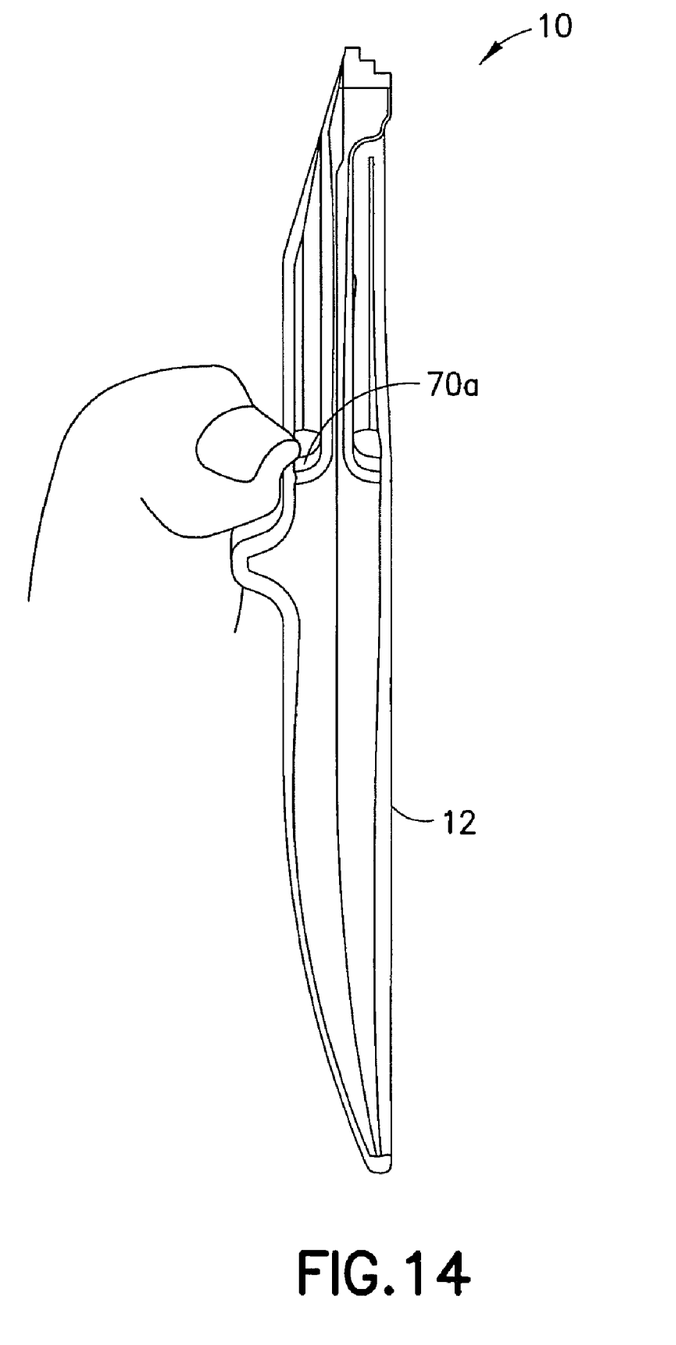
FIG. 14 is a side elevational view of one thumb engaged grip of the wedge handle.

Wedge 39 is contoured to provide a grip 50 disposed between transverse downwardly disposed fulcrum 51 (FIG. 6) and wedge edge 52. Grip 50 includes upper surface 53, lower surface 54 and sides or side surfaces 55 and 56. Upper surface 53 and lower surface 54 extends proximately and upwardly to the wedge edge 52. Wedge sides 55 and 56 extend or bulge outwardly at 57 and 58, between fulcrum 51 and wedge edge 52. In the aforesaid manner of construction, the contoured wedge 39 surfaces provide a grip 50 for member 12 in the fully open position (FIGS. 7 and 19). Wrench 40 is formed with wedge 39. The wedge grip is particularly improved by thumb or index finger engaged in recesses 70a and 71a, as previously discussed, and as best shown in FIG. 4 and FIGS. 7 and 14, respectively.

The Uncoupling Construction

Figure 10:
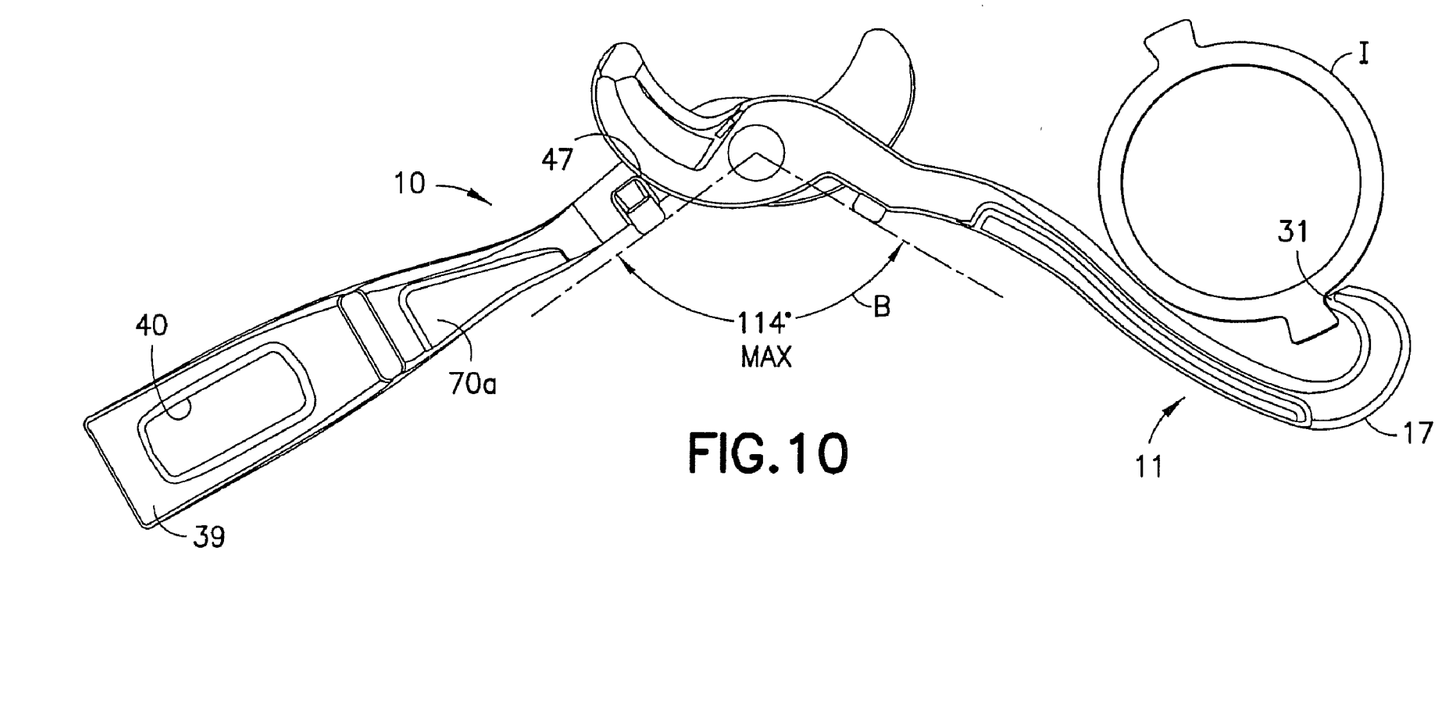
FIG. 10 is a side elevational view in the fully opened position engaged with a fire hose coupling of FIG. 8.
Figure 15:
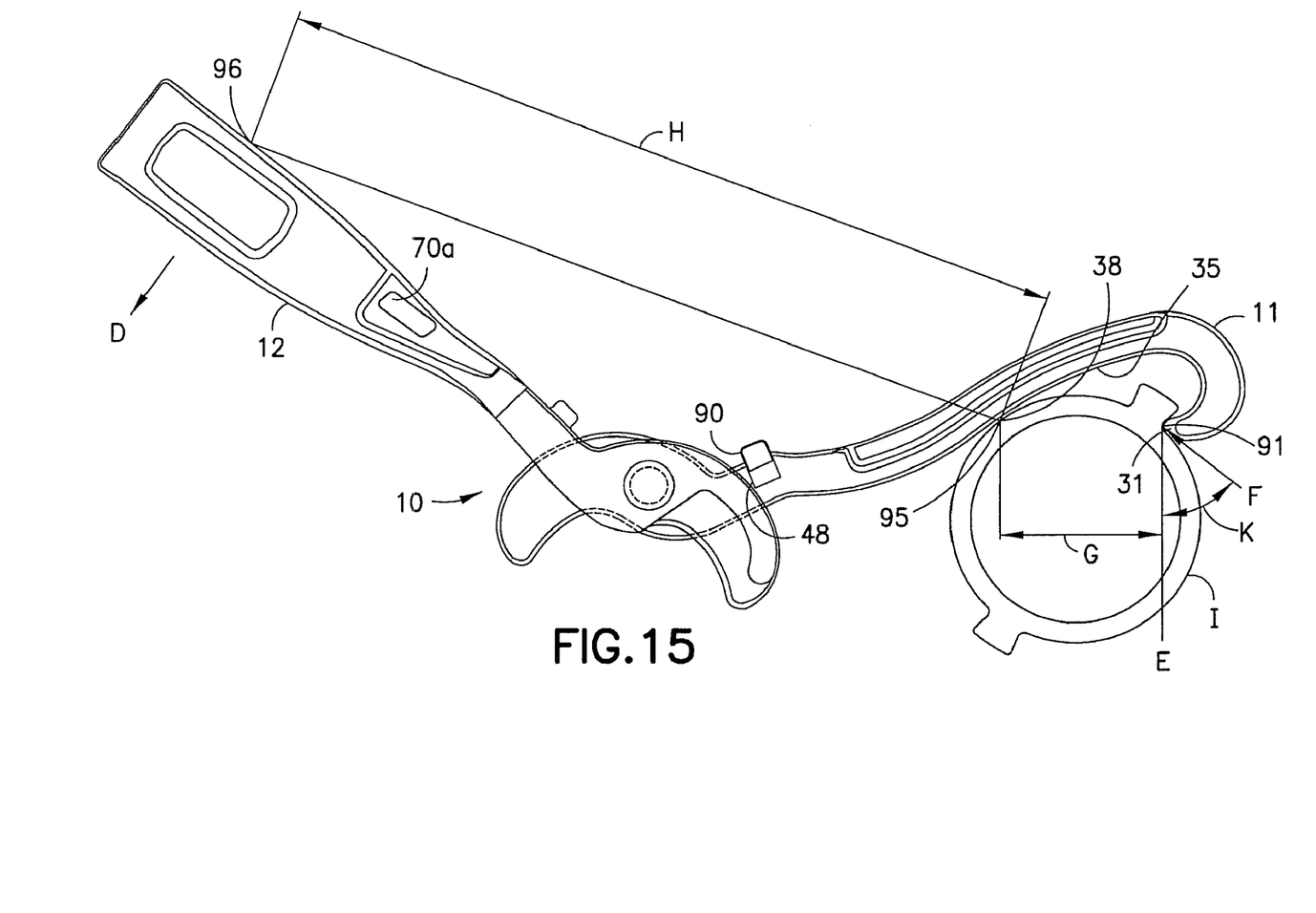
FIG. 15 is a reverse view as in FIG. 10, showing the leverage and torque force vectors, and spatial dispositions.

The present construction is designed to permit members 11 and 12 to open to an angle B of at least about a 100° angle, when operated in the fully opened mode (FIGS. 7 and 15). Most preferably, the handles are fully opened to an angle of at least about 114° (FIG. 10). This large angular disposition in combination with the force transfer bearing contacted handle-jaw surfaces at 47 and 48 cause a substantial torque to be transferred from member 12 to member 11 and in turn exerted on the seized coupling. It has been found that when a 100 lb. force is exerted on handle portion 24 of member 12 in both the upward and sideward directions (arrow D of FIG. 15) a resultant force of at least about 425 lb. is generated on a 4" coupling. A Von Mises (WCS) stress analysis reveals that the area of highest stress is not in the pivot member 20 area, but counterintuitively the surface 28 of member 11. Pivot member 20 and force bearing surfaces at 47 and 48 were found to be surprisingly under essentially minimal or no stress and minimal flexure on displacement when operated in the fully opened disposition. This design and construction further permits an effective high torque force to be generated and transmitted without damage or deformation in and to the pivot member in particular.

Referring specifically to FIG. 15, there is shown tool 10 contactingly engaged with 4" fire hose coupling I. The user grips handle 12 in a thumb or index finger recess 70a engaged mode as shown in FIGS. 7 and 14, and exerts a leverage force as shown by arrow D, which force is transmitted through force bearing surfaces at 47 and 48 to handle 11, and specifically to hook end 31 at the lug contact point 38 and simultaneously to generally sinusoidal surface 35, and more specifically at transitional surface contact point 38. Resultant torque vectors E and F are developed, with E torque vector being the principal vector. Vector F is tangential to the circumference of 4 inch coupling I, and vector E is generally tangential to the hook end 31. Vector F is disposed at an angle K of at about 45° to vector E. When an only about 100 lb. leverage force D is exerted, there is a resultant E torque vector of at least about 425 lb. and an F torque vector of about 280 lb., on the 4" coupling I. The dimensional relation H between the transitional surface contact point 38 and the handle grip midpoint 96 is about 8.7 inches; and the dimensional relationship G between contact point 91 and contact point 95 is about 1.9 inches. The resultant leverage force is applied at points 91 and 95. The H:G is about 8.7:1.906 (i.e. about 1.9). The present tool has a reduced G and reduced H:G compared with the H:G in inches of about 12.2:1.951 with the tool of U.S. Ser. No. 12/751,204, now U.S. Pat. No. 8,065,939. Without wishing to be bound by any theory or mechanism, it is believed that the present H:G contributes to the unexpected high resultant torque force achieved by a limited leverage force of only about 100 lb. with the compact tool.

The Cable Cutter

Jaws 15 and 23 are similar to the construction of the jaws shown in FIG. 2. The present handles construction, and configurations and length ratio construction with jaws 15 and 23 provide heavy duty cable cutter functionality. The cutting force of the present firefighter tool permits the cutting of an aluminum shielded 04 hybrid car battery cable in a single rapid cutting action. The user readily exerts a 120 lb force on the cable. Tool 10 is preferably manufactured entirely of 1080 steel.

Certain firefighter elements viz. wrench 140, and pin 16 are operated in a manner similar to that described in U.S. application Ser. No. 11/857,010, filed Sep. 18, 2007, published as US Pub. No.20080022813 and U.S. application Ser. No. 11/493,682, filed Jul. 26, 2006, published as U.S. Pub. No. 20080022815, which applications are incorporated herein in their entireties by references thereto.

While the present invention has been described by reference to a specific embodiment, it should be understood that modifications and variations of the invention might be constructed without departing from the scope of the invention as defined in the appended claims.

What is claimed is:

1. A compact rescue tool and seized coupling comprising:
(a) said tool comprises;
a first member comprising a proximate end and a distal end, and a proximately disposed first handle and a distally disposed first jaw;
a second member comprising a proximate end and a distal end, and a proximately disposed second handle and a distally disposed second jaw;
means for pivotably connecting the members comprising a pivot axis, and being disposed between the handles and jaws so that the handles pivotably move the jaws from a first operable position to a second operable position;
wherein said first operable position the jaws and handles are fully closed, and in said second operable position the jaws and handles are fully opened;
said jaws and handles having respective torque bearing surfaces in contacting engagement in the second operable position;
said second handle further comprises a grip portion;
said first handle comprises a hook having an edge disposed at the proximate end, said first handle further comprises a generally sinusoidal surface comprising a concave surface, a convex surface and a transitional surface disposed between the convex and concave surfaces, said transitional surface in combination with the hook edge operably engaging differently sized fire hose couplings;
b) said seized coupling comprises a circumferential surface;
(c) said coupling circumferential surface is in contacting engagement with the tool transitional surface at a first point, said second handle having a second point at the length midpoint of said second handle, said first and second points define a dimension H, said hook end defines a third point, said first and third points define a dimension G, and wherein the H:G is about 8.7:1.9, whereby the user grips the second handle grip portion and uncouples the seized coupling.

2. The compact rescue tool and seized coupling of claim 1, wherein the second handle is greater than 7 inches and the first handle is less than 7 inches, and the second handle is at least about 20% greater in length than the first handle.

3. The compact rescue tool and seized coupling of claim 1, wherein the second handle grip portion comprises a T-shaped section, and said T-shaped section comprises thumb receiving recesses for alternate left and right hand operability in the second operable position.

4. The compact rescue tool and seized coupling of claim 1, further comprising in combination; a cargo pants pocket, said tool being disposed sideways within the cargo pants pocket with the handles in the fully closed position.

5. The compact rescue tool and seized coupling of claim 1, wherein the handles are disposed at approximately 114° in the second operable position.

6. The compact rescue tool and seized coupling of claim 1, said second handle comprises a wedge having an elongate edge transversely disposed to the pivot axis and said second handle further comprises a grip portion, said grip portion comprises oppositely disposed thumb engaging recesses adjacent and distally disposed to the wedge.

7. A method for operating a rescue tool in combination with a seized coupling comprising:
   (a) providing a rescue tool comprising;
      a first member comprising a proximate end and a distal end, and a proximately disposed first handle and a distally disposed first jaw;
      a second member comprising a proximate end and a distal end, and a proximately disposed second handle and a distally disposed second jaw;
      means for pivotably connecting the members comprising a pivot axis, and being disposed between the handles and jaws so that the handles pivotably move the jaws from a first operable position to a second operable position;
      wherein said first operable position the jaws and handles are fully closed and in said second operable position the jaws and handles are fully opened;
      said jaws and handles having respective torque bearing surfaces in contacting engagement in the second operable position;
      said second handle comprises a grip portion extending around the handle, said first handle comprises a hook disposed at the proximate end, said first handle further comprises a generally sinusoid surface in combination with the hook for operably engaging differently sized fire hose couplings;
   (b) providing a seized coupling having a circumferential surface;
   (c) disposing the tool and seized coupling in the second operable position; and
   (d) gripping the second handle grip portion in the second operable position and exerting a leverage force through the contactingly engaged force bearing surfaces to the generally sinusoidal surface and hook to exert a torque force for uncoupling the seized fire hose coupling;
   wherein said coupling circumferential surface is in contacting engagement with the tool transitional surface at a first point, said second handle having a second point at the length midpoint of said second handle, said first and second points define a dimension H, said hook end defines a third point, said first and third points define a dimension G, and wherein the H:G is about 8.7:1.9.

8. The method of claim 7, wherein the second handle is greater than 7 inches and the first handle is less than 7 inches, and the second handle is at least about 20% greater in length than the first handle.

9. The method of claim 7, wherein the second handle grip portion comprises a T-shaped section, and said T-shaped section comprises thumb or index finger receiving recesses for alternate left and right hand operability in the second operable position.

10. The method of claim 9, wherein step (b) further comprises gripping the second handle grip portion with one hand with the thumb or index finger disposed in a corresponding one of said receiving recesses.

11. The method of claim 10, further comprising exerting the leverage force with one hand gripping the second handle grip portion.

12. The method of claim 7, wherein the handles are disposed at approximately 114° in the second operable position.

13. The method of claim 7, further comprising (e) providing a cargo pants pocket, and (f) storing said tool sideways within the cargo pants pocket with the handles in the fully closed position.

14. The method of claim 7, wherein there is a second resultant torque vector force of at least about 280lb disposed at about 45° to the first resultant torque vector.

15. A method for operating a rescue tool in combination with a seized coupling comprising:
   (a) providing a rescue tool comprising;
      a first member comprising a proximate end and a distal end, and a proximately disposed first handle and a distally disposed first jaw;
      a second member comprising a proximate end and a distal end, and a proximately disposed second handle and a distally disposed second jaw;
      means for pivotably connecting the members comprising a pivot axis, and being disposed between the handles and jaws so that the handles pivotably move the jaws from a first operable position to a second operable position;
      wherein said first operable position the jaws and handles are fully closed and in said second operable position the jaws and handles are fully opened;
      said jaws and handles having respective torque bearing surfaces in contacting engagement in the second operable position;
      said first handle comprises a grip portion extending around the handle, said second handle comprises a hook disposed at the proximate end, said second handle further comprises a generally sinusoid surface in combination with the hook for operably engaging differently sized fire hose couplings;
   (b) providing a seized coupling having a circumferential surface, said coupling circumferential surface in contacting engagement with the transitional surfaces at a first point, said second handle having a second point at the midpoint of the length of the second handle, said first and second point defines a dimension H, said hook end defines a third point, said first and third points define a dimension G, wherein the H:G is about 8.7:1.9
   (c) disposing the tool and seized coupling in the second operable position; and
   (d) gripping the first handle grip portion in the second operable position and exerting a leverage force through the contactingly engaged force bearing surfaces to the generally sinusoidal surface and hook to exert a torque force and (e) uncoupling the seized fire hose coupling.

16. The method of claim 15, further comprises applying a second handle grip force of about 100 and consequently developing a resultant torque force of least about 425lbs. to uncouple a 4" seized fire hose coupling.

* * * * *